United States Patent
Damjanovic et al.

(10) Patent No.: US 11,447,012 B2
(45) Date of Patent: Sep. 20, 2022

(54) DISPLAY UNIT FOR DISPLAYING A REMAINING RANGE IN A MOTOR VEHICLE

(71) Applicant: Bayerische Motoren Werke Aktiengesellschaft, Munich (DE)

(72) Inventors: Ana Damjanovic, Munich (DE); Keyvan Karami-Malamiri, Munich (DE); Grigor Zapryanov, Garching (DE); Joerg Moellmann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/982,357

(22) Filed: May 17, 2018

(65) Prior Publication Data
US 2018/0264967 A1    Sep. 20, 2018

Related U.S. Application Data

(63) Continuation of application No. PCT/EP2016/077437, filed on Nov. 11, 2016.

(30) Foreign Application Priority Data

Nov. 18, 2015   (DE) .................... 10 2015 222 795.2

(51) Int. Cl.
*B60L 58/12*     (2019.01)
*B60K 37/06*    (2006.01)
(Continued)

(52) U.S. Cl.
CPC ............. *B60K 37/06* (2013.01); *B60K 35/00* (2013.01); *B60L 58/12* (2019.02); *B60W 10/08* (2013.01);
(Continued)

(58) Field of Classification Search
USPC .......................................................... 701/22
See application file for complete search history.

(56) References Cited

U.S. PATENT DOCUMENTS 5,539,377 A * 7/1996 Dillon ..................... B60R 25/04
                                                           307/10.2
8,289,143 B2 * 10/2012 Mizutani .................. B60K 6/32
                                                            340/438
(Continued)

FOREIGN PATENT DOCUMENTS

| CN | 103717432 A | 4/2014 |
| CN | 104057826 A | 9/2014 |

(Continued)

OTHER PUBLICATIONS

2014 Dodge Grand Caravan Owner's Manuel, all pages (Year: 2014).*

(Continued)

*Primary Examiner* — James M McPherson
(74) *Attorney, Agent, or Firm* — Crowell & Moring LLP

(57) ABSTRACT

The invention relates to a display unit for displaying at least one remaining range in a motor vehicle in accordance with the remaining energy supply in at least one drive system, such as the tank fill level in a vehicle driven by a combustion engine and/or the state of charge of the high-voltage battery in a vehicle driven by an electric motor. The display of the remaining range may be hidden even when there is a remaining energy supply if at least one defined operating condition is met. A defined operating condition allows the conclusion that a unit of the drive system is at least temporarily unavailable.

10 Claims, 4 Drawing Sheets

(51) Int. Cl.
*B60K 35/00* (2006.01)
*B60W 10/08* (2006.01)

(52) U.S. Cl.
CPC .. *B60K 2370/174* (2019.05); *B60K 2370/186* (2019.05); *B60L 2260/52* (2013.01); *B60W 2530/209* (2020.02); *Y02T 10/84* (2013.01)

(56) References Cited

U.S. PATENT DOCUMENTS

| | | | |
|---|---|---|---|
| 2007/0167105 A1* | 7/2007 | Lorelli | A63H 17/02 446/6 |
| 2012/0179420 A1* | 7/2012 | Gilman | G01C 21/3697 702/165 |
| 2012/0316781 A1 | 12/2012 | Krauss et al. | |
| 2014/0277920 A1* | 9/2014 | Raniere | G01F 23/363 701/32.8 |
| 2015/0100226 A1* | 4/2015 | Skaff | B60K 35/00 701/123 |
| 2015/0217782 A1* | 8/2015 | Kassner | B60W 50/14 340/438 |
| 2016/0243941 A1* | 8/2016 | Kishida | B60K 35/00 |
| 2016/0253707 A1* | 9/2016 | Momin | G01C 21/34 705/14.54 |
| 2016/0258134 A1* | 9/2016 | Matsumoto | E02F 9/26 |
| 2017/0101023 A1* | 4/2017 | Nawata | B60L 55/00 |
| 2018/0321323 A1* | 11/2018 | Dubarry | G01R 31/392 |

FOREIGN PATENT DOCUMENTS

| | | |
|---|---|---|
| CN | 104442627 A | 3/2015 |
| CN | 104816634 A | 8/2015 |
| DE | 196 12 062 B4 | 4/2007 |
| DE | 10 2007 042 351 A1 | 3/2009 |
| DE | 10 2009 039 092 A1 | 3/2011 |
| DE | 10 2010 010 445 A1 | 8/2011 |
| DE | 10 2011 116 314 A1 | 4/2013 |
| DE | 10 2012 004 642 A1 | 9/2013 |
| JP | 11-220803 A | 8/1999 |
| JP | 2011-57117 A | 3/2011 |
| WO | WO 2014/033380 A1 | 3/2014 |

OTHER PUBLICATIONS

International Search Report (PCT/ISA/210) issued in PCT Application No. PCT/EP2016/077437 dated Mar. 20, 2017 with English translation (five pages).

German-language Written Opinion (PCT/ISA/237) issued in PCT Application No. PCT/EP2016/077437 dated Mar. 20, 2017 (five pages).

German-language Search Report issued in counterpart German Application No. 10 2015 222 795.2 dated Jun. 2, 2016 with partial English translation (14 pages).

"Bordcomputer", Bedienungsanleitung Peugoet 508, Jan. 1, 2011, three pages, XP002767836.

Chinese Office Action issued in Chinese application No. 201680060673.3 dated Mar. 24, 2020, with English translation (Thirteen (13) pages).

\* cited by examiner

DISPLAY UNIT FOR DISPLAYING A REMAINING RANGE IN A MOTOR VEHICLE

CROSS REFERENCE TO RELATED APPLICATIONS

This application is a continuation of PCT International Application No. PCT/EP2016/077437, filed Nov. 11, 2016, which claims priority under 35 U.S.C. § 119 from German Patent Application No. 10 2015 222 795.2, filed Nov. 18, 2015, the entire disclosures of which are herein expressly incorporated by reference.

BACKGROUND AND SUMMARY OF THE INVENTION

The invention relates to a display unit for displaying at least one remaining range in a motor vehicle, which for example, can be a motor vehicle with only one drive system (for example with an internal combustion engine or an electric motor), but can also be a hybrid drive with two drive systems (for example with an internal combustion engine and an electric motor).

A number of methods are already known for determining and displaying remaining ranges in motor vehicles, electric vehicles, and/or hybrid vehicles.

Presently, in almost every vehicle, a remaining range (basic remaining range), which is given by the ratio of the current tank contents or energy storage unit contents to the current fuel or energy consumption, is determined and, for example, displayed in the context of an onboard computer function or in the combination instrument.

DE 196 12 062 B4 discloses a display unit for data that is dependent on the energy consumption of a vehicle is known, where instead of a remaining range value, a range of remaining ranges is displayed, which is determined as a function of the amount of energy currently contained in the energy storage device while taking account of different driving styles and different driving conditions. The limits of the range can be determined while taking account of different driving styles and different driving conditions of a vehicle-specific and possibly a driver-specific consumption spectrum. By analyzing the individual driving behavior of the driver over a defined period of time, the displayed range of remaining ranges can be adjusted empirically.

For example, DE 10 2009 039 092 A1 discloses a method for determining at least two different defined remaining ranges is known such that from the representation thereof the driver can rapidly determine whether his driving style is energy efficient or how great the difference is between his driving style and an energy efficient driving style.

It is the object of the invention to extend the functionality of a display system for displaying the remaining range.

The invention is directed to a display unit for displaying at least one remaining range in a motor vehicle as a function of the stored energy of at least one drive system (for example the tank contents for an internal combustion engine drive and/or a high-voltage battery state of charge for an electric motor drive), where the display of the remaining range can be suppressed despite there being stored energy if at least one defined operating condition exists. A defined operating condition may indicate at least temporary unavailability of a unit of the drive system (for example, a drive system with an electric motor, a drive system with an internal combustion engine, a drive system with fuel cells, etc.). However, it would also be possible according to the invention for a defined operating condition to indicate permanent unavailability of a unit in an emergency or a total failure of a unit, for example.

The invention thus at least suppresses the display of a remaining range as long as the drive unit that is necessary for this is not available or has only limited availability. The term "unavailability" means both limited availability and a complete lack of availability in the following.

The invention is based on the following considerations:

A remaining range algorithm in the vehicle calculates the resulting remaining range based on the current level or energy reserve of the respective energy source of a drive system. The energy source may be the fuel of a fuel tank or a high-voltage battery (where, for example, level is the state of charge). In the case of a combination of a plurality of energy sources in the vehicle, during the calculation of the total remaining range, the sum of the individual remaining ranges is formed.

The (total) remaining range that is calculated in this way is displayed to the user in the combination instrument. The information about the current remaining range in the vehicle can also be provided to mobile terminals via the backend.

The calculation of the remaining range based only on the current level does not take into account the availability of the units of the respective associated drive system.

A unit can be an internal combustion engine, an electric motor, and/or a fuel cell, which constitutes the drive source in the vehicle by energy conversion.

A unit may be temporarily or permanently unavailable for different reasons.

Where unit availability is not taken into account, despite an existing fuel level or energy reserve, the motor vehicle may remain at a standstill despite a remaining range being indicated.

Therefore, according to the invention, suppressing the display of the remaining range is provided while the respective unit is not available.

The availability of a unit can, for example, be influenced by faults or by exceeding system and component limits.

For example, an electric motor drive system may include the following components: a traction machine, a high-voltage storage device, and drive electronics.

In this case for example, the following faults and/or exceeding and falling below system and component limits may result in temporary or even permanent unavailability of the electric motor drive system: (i) at least limited battery operation because of some or all defective sub storage units; (ii) sensor failure; (iii) a fault in the electric motor; (iv) CAN bus signal failures; and/or (v) minimum or maximum temperature limits of the high-voltage storage device are fallen below or exceeded.

For example, the following faults and/or exceeding or falling below system and component limits may result in temporary or even permanent unavailability of an internal combustion engine drive system: (i) faults in the control unit or in the control and regulation process of the internal combustion engine, for example detected by a suitable diagnosis, resulting in deviation from the control mode; (ii) faults in control of the charging pressure; (iii) faults in the injection and mixture formation system; (iv) faults in the coolant circuit; (v) faults in the oil supply; (vi) faults in the exhaust aftertreatment system; and/or (vii) faults in auxiliary units (for example, a 12V generator) or in diverse finally control elements or sensors (for example, a VVT control element, a crankshaft revolution rate sensor, etc.).

According to the invention, taking account of the availability of drive units prevents displaying a remaining range that is too long and giving the driver a false sense of security.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
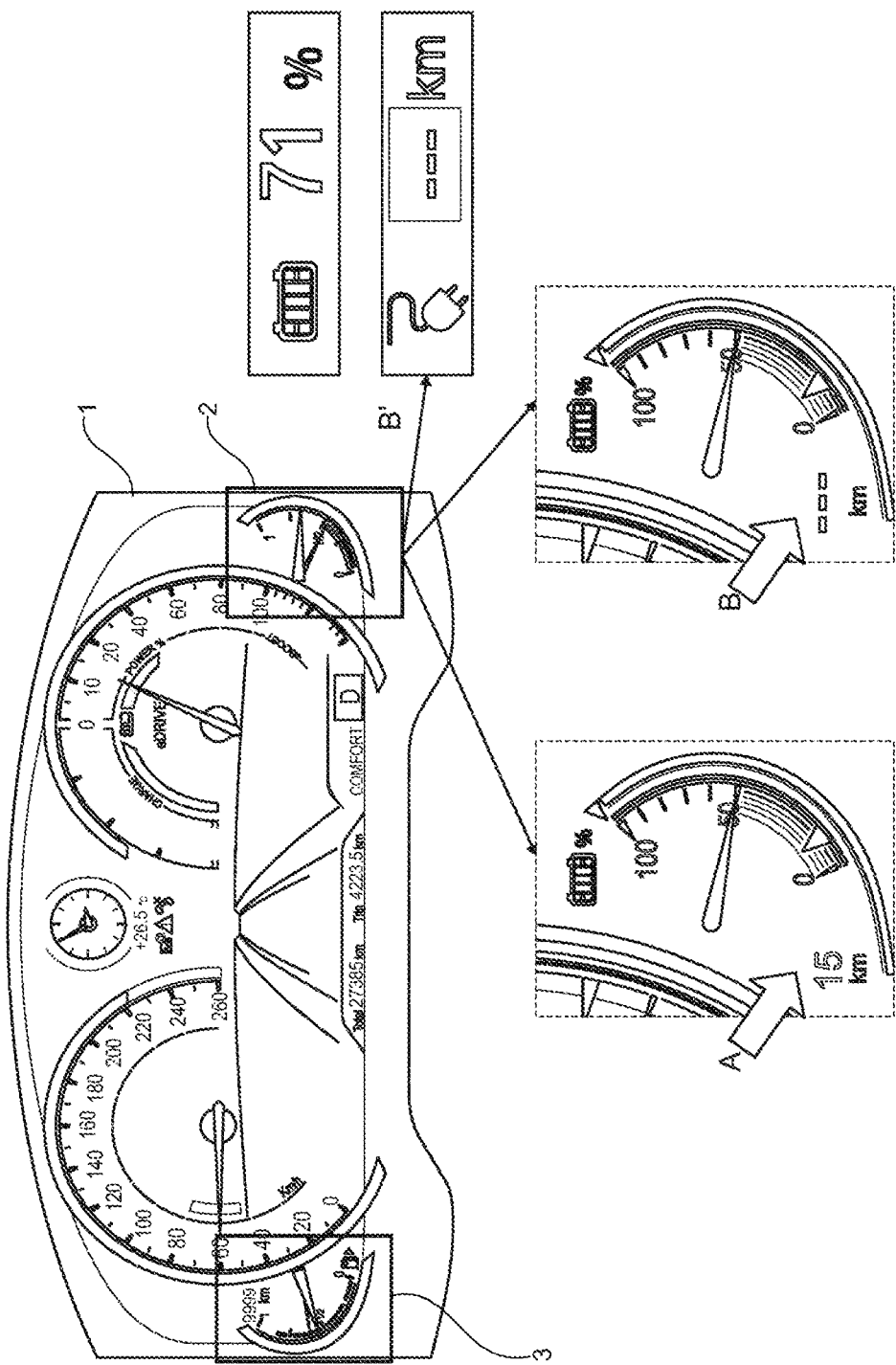
FIG. 1 illustrates remaining range displays in a combination instrument for a hybrid vehicle with an electric motor and with an internal combustion engine drive system.

In FIG. 1, an individual display unit 2 for an electric motor drive system and an individual display unit 3 for an internal combustion engine drive system are represented in a combination instrument 1 for a hybrid vehicle that is not shown in detail. The individual display unit 2 contains a known first display of the energy reserve in the form of a state of charge of the high-voltage storage device, and a second display A indicating the remaining range of the electric drive system (in FIG. 4 denoted by RW_E). According to the invention, for example, the display A is suppressed on detecting at least temporary unavailability of the high-voltage storage device (for example, in the event of overheating or where the minimum required operating temperature has not yet been reached in the presence of cold external temperatures). In the example shown, instead of the display A, an alternative display B—here three dashes—is incorporated (not zero). In addition or alternatively to the display B, a display B' can be output in the combination instrument 1. At the same time, however, the display of the energy reserve, here still 70% of the battery charge, remains displayed unchanged. It can, however, also be optionally suppressed, greyed out, or commented with an additional display.

Figure 2:
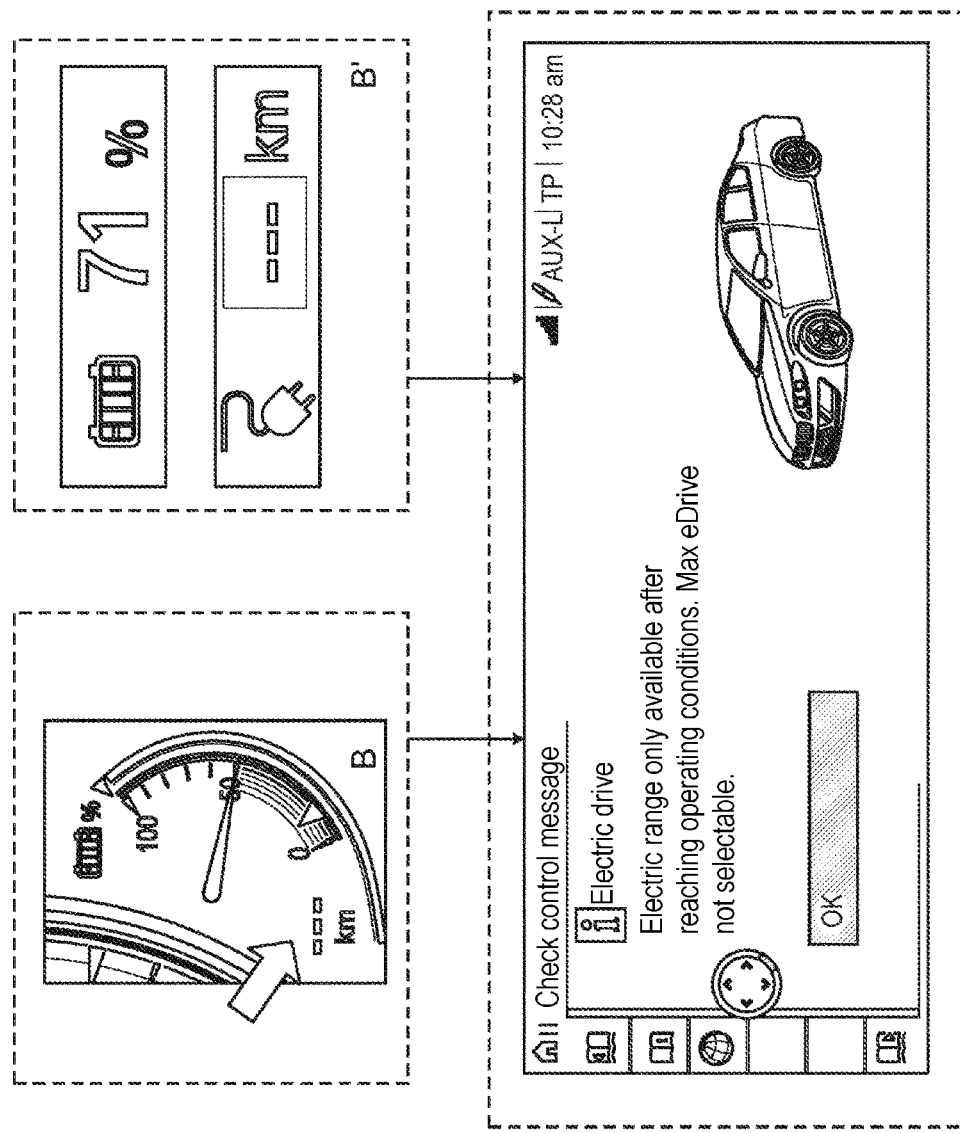
FIG. 2 illustrates options for a suppressed remaining range display for the electric motor drive system with simultaneous additional information for the driver.

FIG. 2 shows that in addition to suppressing a remaining range display, information about the reasons for suppression can be displayed to the driver in a further display (in the case of BMW, for example, the display for check-control messages).

Figure 3:
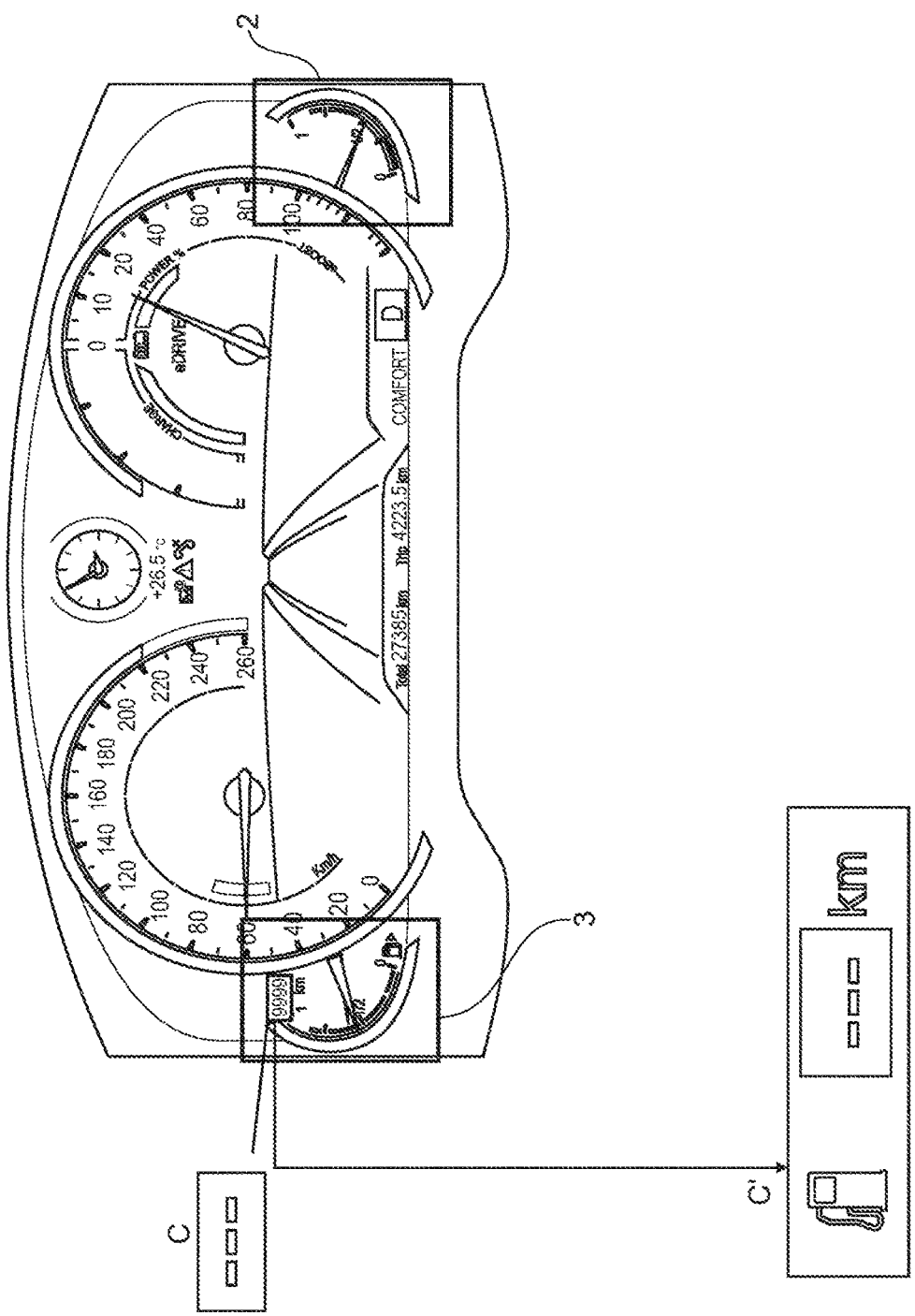
FIG. 3 illustrates the option of a suppressed remaining range display for the internal combustion engine drive system.
Figure 4:
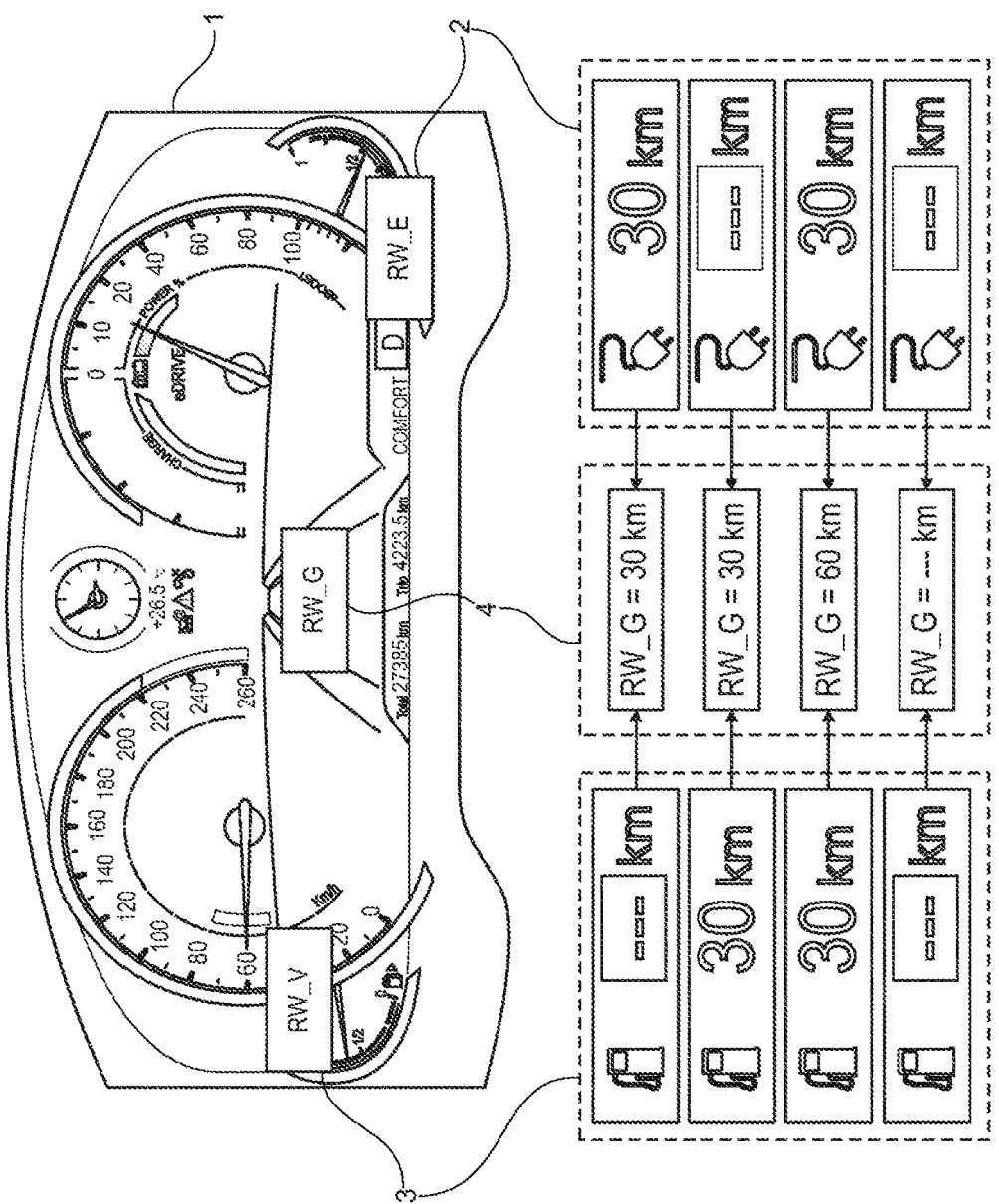
FIG. 4 illustrates examples of the display according to the invention of a total remaining range for different suppressed individual remaining ranges.

FIG. 3 shows, similarly to the exemplary embodiment according to FIG. 1, the suppression of the remaining range (here symbolically "9999" km) for the internal combustion engine drive system (in FIG. 4 denoted by RW_V). Here, for example, an alternative display C and/or C' is output. The current stored energy continues to be displayed here in the form of the tank contents.

FIG. 4 shows an entire display unit consisting of the combination instrument 1, of the individual display units 2 and 3 for the individual remaining ranges RW_E and RW_V and of an additional (possibly only displayed on request) sub display unit 4 for the total remaining range RW_G.

Using four examples, it is shown that the total remaining range RW_G is formed in each case from the sum of the non-suppressed displays relating to the individual remaining ranges RW_V and RW_E. Because there are only two drive units here, this means in detail: (i) if the remaining range RW_V is suppressed, the total remaining range RW_G only indicates the remaining range RW_E; (ii) if the remaining range RW_E is suppressed, the total remaining range RW-G only indicates the remaining range RW-V; (iii) if neither of the remaining ranges RW_V and RW_E is suppressed, the total remaining range RW_G indicates the sum of the individual remaining ranges RW_V and RW_E; (iv) if both remaining range RW_V are suppressed, the total remaining range RW_G is also suppressed.

In the present case, the energy reserves—e.g., here the tank display and the battery state of charge—continue to be displayed as valid.

The control of the display unit, in this case the combination instrument 1 with the individual display units 2 and 3 and with the sub display unit 4 for the total remaining range RW_G, is carried out here by an electronic control unit that is not shown in detail, which contains a suitable program module for this purpose.

In addition, it should be noted that in a development of the invention, with the remaining range RW_E for the electric motor drive suppressed, other drive strategies can be activated. For example: (i) a possibly arbitrarily activatable mode for driving with maximum electrical energy (MAXeDrive with BMW for example) is prohibited; and/or (ii) a change is automatically made to the most energy-saving drive mode.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A display unit comprising:
a control unit configured to:
cause a visual display to display at least one remaining range in a motor vehicle as a function of stored energy of an energy store for at least one drive system of the motor vehicle, and
suppress the display of the at least one remaining range, despite the energy store having stored energy corresponding to the at least one remaining range, in response to a determination that at least one defined operating condition exists,
wherein the control unit is further configured to detect at least temporary unavailability of a unit of the drive system by checking the defined operating condition.

2. The display unit according to claim 1, wherein the stored energy of the at least one drive system includes stored electric energy of an electric motor drive system, and wherein the defined operating condition indicates at least temporary unavailability of a high-voltage storage device of the electric motor drive system.

3. The display unit according to claim 1, wherein the stored energy of the at least one drive system includes fuel-related stored energy of an internal combustion engine drive system, and wherein the defined operating condition indicates at least temporary unavailability of a unit of the internal combustion engine drive system.

4. The display unit according to claim 1, wherein the stored energy of the at least one drive system includes fuel-cell related stored energy of a fuel-cell drive system, and wherein the defined operating condition indicates at least temporary unavailability of a unit of the fuel-cell drive system.

5. The display unit according to claim 1, wherein the motor vehicle has at least two drive systems, and wherein the control unit is further configured to:
   display a respective remaining range of each drive system and a total remaining range, and
   specify a sum of non-suppressed respective remaining ranges as the total remaining range.

6. A method, comprising:
   displaying, via an electronic control unit, at least one remaining range in a motor vehicle as a function of stored energy of an energy store for at least one drive system of the motor vehicle;
   detecting, by the electronic control unit, at least temporary unavailability of a unit of the drive system by determining whether a defined operating condition exists; and
   suppressing, by the electronic control unit, the display of the at least one remaining range, despite the energy store having stored energy corresponding to the at least one remaining range, in response to determining that the defined operating condition exists.

7. The method according to claim 6, wherein the stored energy of the at least one drive system includes stored electric energy of an electric motor drive system, and wherein the defined operating condition indicates at least temporary unavailability of a high-voltage storage device of the electric motor drive system.

8. The method according to claim 6, wherein the stored energy of the at least one drive system includes fuel-related stored energy of an internal combustion engine drive system, and wherein the defined operating condition indicates at least temporary unavailability of a unit of the internal combustion engine drive system.

9. The method according to claim 6, wherein the stored energy of the at least one drive system includes fuel-cell related stored energy of a fuel-cell drive system, and wherein the defined operating condition indicates at least temporary unavailability of a unit of the fuel-cell drive system.

10. The method according to claim 6, wherein the motor vehicle has at least two drive systems, the method further comprising:
   displaying, via the electronic control unit, a respective remaining range of each drive system and a total remaining range, and
   specifying, by the electronic control unit, a sum of non-suppressed respective remaining ranges as the total remaining range.

* * * * *